United States Patent

Angus

[11] Patent Number: 4,747,900
[45] Date of Patent: May 31, 1988

[54] METHOD OF MANUFACTURE OF COMPRESSOR ROTOR ASSEMBLY

[75] Inventor: James P. Angus, Penrith, England
[73] Assignee: Rolls-Royce plc, London, England
[21] Appl. No.: 741,587
[22] Filed: Jun. 5, 1985

[30] Foreign Application Priority Data

Jul. 7, 1984 [GB] United Kingdom ............... 8417417

[51] Int. Cl.⁴ .................... B65H 81/00; B29C 45/14; B64C 27/46
[52] U.S. Cl. .................. 156/172; 156/182; 156/245; 164/900; 264/108; 264/328.2; 264/328.12; 264/328.18; 416/189; 416/198 A; 416/230; 416/244 A
[58] Field of Search ............ 416/189 R, 195, 244 A, 416/230 R, 215, 216, 230 R; 164/900; 264/328.18, 328.1, 328.2, 328.4, 328.5, 328.6, 328.8, 328.12, 382.17; 74/572; 156/172, 175, 245

[56] References Cited

U.S. PATENT DOCUMENTS

| | | | |
|---|---|---|---|
| 3,403,844 | 10/1968 | Stoffer | 416/229 A X |
| 3,424,434 | 1/1969 | Palfreyman et al. | 416/230 |
| 3,456,917 | 7/1969 | Palfreyman et al. | 416/230 X |
| 3,501,090 | 3/1970 | Stoffer et al. | 416/189 R |
| 3,549,444 | 12/1970 | Katz | 156/175 |
| 3,632,460 | 1/1972 | Palfreyman et al. | 156/175 |
| 3,754,839 | 9/1973 | Bodman | 416/195 |
| 3,846,045 | 11/1974 | Mincuzzi | 416/230 |
| 3,865,509 | 2/1975 | Frazzell et al. | 416/93 |
| 3,901,961 | 8/1975 | Görter et al. | 264/108 |
| 3,932,062 | 1/1976 | Sisk | 416/230 |
| 4,248,817 | 2/1981 | Frank | 264/102 |
| 4,312,917 | 1/1982 | Hawley | 428/375 |
| 4,339,229 | 7/1982 | Rossman | 416/218 |
| 4,354,804 | 10/1982 | Cruzen | 416/230 |
| 4,388,042 | 6/1983 | Weber | 416/198 |
| 4,413,860 | 11/1983 | Prescott | 301/63 PW |
| 4,464,097 | 8/1984 | Schultz | 416/230 |
| 4,465,434 | 8/1984 | Rourk | 416/230 |
| 4,494,287 | 1/1985 | Cruzen et al. | 29/156.8 R |
| 4,576,770 | 3/1986 | Schultz | 264/103 |
| 4,627,472 | 12/1986 | Goettler et al. | 264/108 |

Primary Examiner—Michael Ball
Assistant Examiner—David Herb
Attorney, Agent, or Firm—Cushman, Darby & Cushman

[57] ABSTRACT

A compressor rotor assembly comprises a shaft and at least one disc having integral radially extending aerofoil blades which disc is integral with the shaft. The assembly comprises a matrix material in which a plurality of short reinforcing fibres are so disposed that the majority thereof within the shaft are generally axially aligned while the majority thereof within the aerofoil blades are generally radially aligned. At least one filament wound support ring provides radial support for the aerofoil blades.

15 Claims, 2 Drawing Sheets

METHOD OF MANUFACTURE OF COMPRESSOR ROTOR ASSEMBLY

This invention relates to a compressor rotor assembly and to a method of manufacture of such an assembly.

It is known to manufacture a disc with integral aerofoil blades, for instance one which is suitable for use in an axial flow compressor of a gas turbine engine, by injecting an appropriate resin matrix material into a die containing reinforcing fibres which have been aligned in a predetermined manner. There are problems with such a method of manufacture however in ensuring that the fibres remain in the desired configuration during the injection operation. Moreover, it is difficult to ensure that all of the fibres are so disposed as to provide a bladed disc with optimum strength characteristics. A further disadvantage of the method is that it can be expensive in view of the fact that the reinforcing fibres usually have to be laid-up by hand. After manufacture, the bladed discs have to be mounted on a separate shaft, so making the resultant complete rotor assembly an expensive item to produce.

It is an object of the present invention to provide a compressor rotor assembly which is cheap and simple to manufacture.

Discs with integral aerofoil blades also suffer from problems associated with the centrifugal loads which are imposed upon the aerofoil blades during disc rotation. Thus it is difficult to ensure that the fibre reinforcement of the bladed disc is such that the aerofoil blades are provided with adequate support against centrifugal loading.

It is accordingly a further object of the present invention to provide a compressor rotor assembly with a disc having integral aerofoil blades which are provided with adequate support to resist the centrifugal loadings imposed upon them during rotation of the compressor rotor assembly.

According to the present invention, a method of manufacturing a compressor rotor assembly comprising a shaft and at least one disc having integral radially extending aerofoil blades which disc is coaxially mounted on said shaft and is integral therewith comprises injecting a mixture of short fibres and a matrix material into a dividable die so configured as to define the form of said compressor rotor assembly, said mixture being injected into said die at such a location that the majority of said fibres in said mixture which enter that portion of said die defining said shaft are generally axially aligned and the majority of said fibres in said mixture which enter those portions of said die which define said aerofoil blades are generally radially aligned, said portion of said die defining said at least one bladed disc containing at least one support ring which is so positioned within said die as to be integral and coaxial with said bladed disc after said injection moulding step and additionally provide radial support for the thus moulded aerofoil blades and subsequently opening said die to release the thus moulded compressor rotor assembly.

According to a further aspect of the present invention, a compressor rotor assembly is formed from a matrix material having short reinforcing fibres dispersed therein, said compressor rotor assembly comprisng at least one disc having integral radially extending aerofoil blades which disc is coaxially mounted on a shaft, the majority of said short reinforcing fibres within said aerofoil blades being generally radially aligned, said at least one bladed disc having at least one coaxially disposed support ring integral therewith which is so positioned as to provide radial support for said aerofoil blades upon the rotation of said compressor rotor assembly.

The invention will now be described, by way of example, with reference to the accompanying drawings in which.

Figure 1:
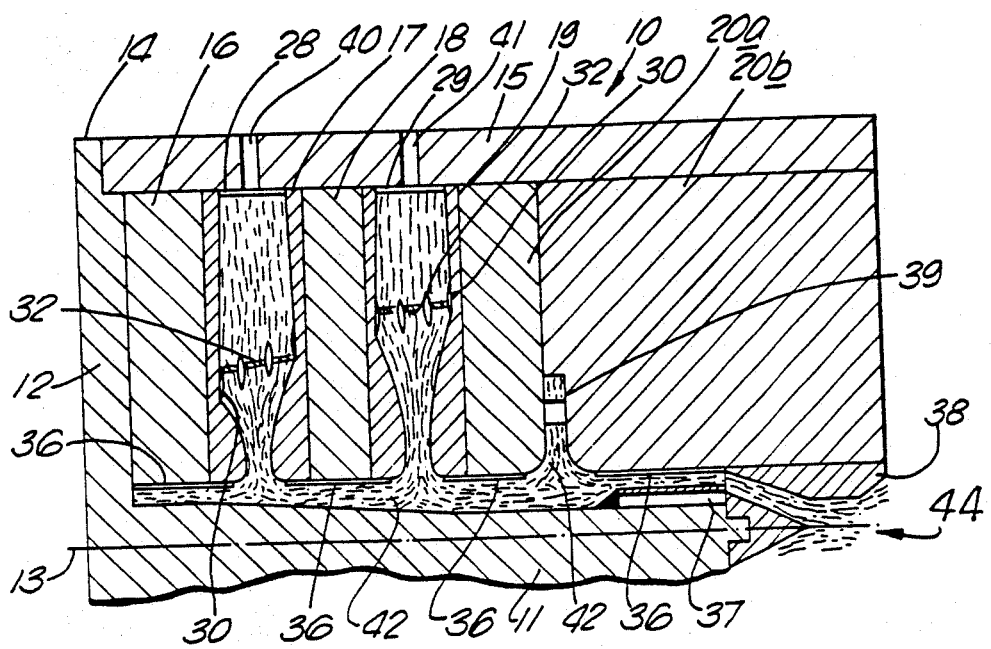
FIG. 1 is a view of a dividable die for use in the method of the present invention.
Figure 4:
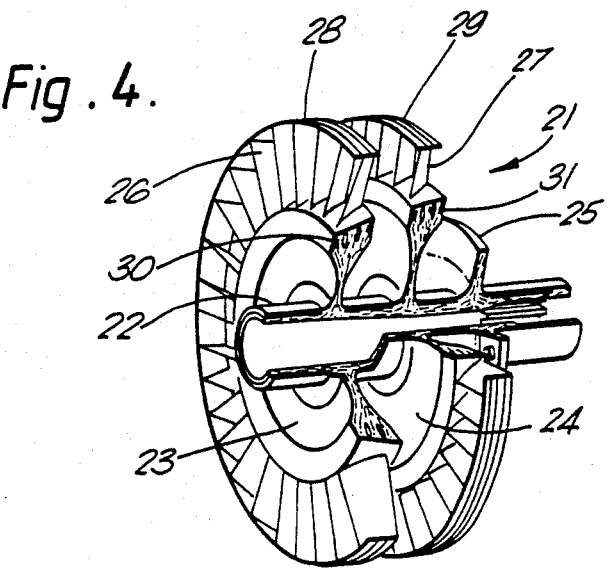
FIG. 4 is a partially sectioned view of a compressor rotor assembly in accordance with the present invention.

With reference to FIG. 1, a generally cylindrical dividable die indicated at 10 comprises a cylindrical core 11 having an integral disc 12 at one end thereof which is normal to the longitudinal axis 13 of the core. The disc 12 is circumferentially stepped at 14 to receive a hollow cylindrical retaining member 15. The retaining member 15 encloses a plurality of generally disc-shaped pieces 16, 17, 18, 19 20a and 20b which together serve to define the internal configuration of the die 10. That configuration is of a compressor rotor assembly which is in accordance with the present invention and which is generally indicated in its final form at 21 in FIG. 4.

The compressor rotor assembly 21 comprises a hollow shaft 22 upon which two discs 23 and 24 and a mounting flange 25 for a further disc (not shown) are integrally mounted. The discs 23 and 24 and the flange 25 lie in parallel planes which are normal to the longitudinal axis of the shaft 22. The discs 23 and 24 are are respectively provided on their peripheries with annular arrays of radially extending aerofoil blades 26 and 27. The aerofoil blades 26 and 27 are integral with their respective discs 23 and 24 and are respectively provided with support rings which are in the form of integral shrouds 28 and 29 to provide radial support for the aerofoil blade 26 and 27 upon the rotation of the compressor rotor assembly 21. Additional radial support for the aerofoil blades 26 and 27 is respectively provided by support rings 30 and 31 which are respectively embedded within the discs 23 and 24 adjacent the radially inner regions of the aerofoil blades 26 and 27. Although the compressor rotor assembly 21 is shown with both shroud support rings 28 and 29 and support rings 30 and 31 to provide radial support for the aerofoil blades 26 and 27, it may be found that only one form of support is necessary. Essentially the degree of radial support required is determined by the rotational speed which the assembly 21 is likely to attain in operation since it is the centrifugal loadings upon the aerofoil blades 26 and 27 which necessitate their radial support. Thus each of the bladed discs 23 and 24 may be provided with either or both of the shroud support rings 28 and 29 and the support rings 30 and 31.

Figure 2:
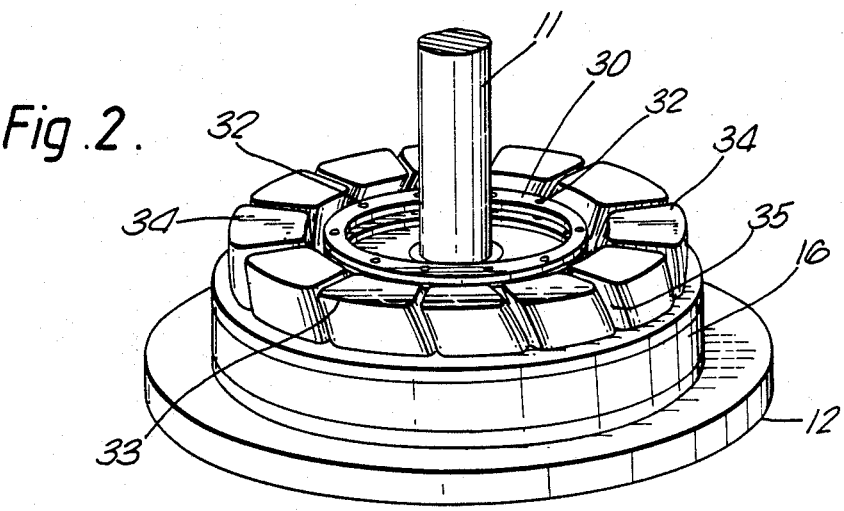
FIG. 2 is a view of a part of the dividable die shown in FIG. 1 containing four support rings.

The compressor rotor assembly 21 is formed mainly from chopped carbon fibres dispersed within a polyetheretherketone resin matrix material. However, the shrouds support rings 28 and 29 and the support rings 30 and 31 are formed from filament wound carbon fibres in a matrix of an epoxy resin. The support rings 30 and 31 are manufactured separately from carbon fibre in an epoxy resin matrix by conventional filament winding methods and placed within the dividable die 10 as can be seen in FIG. 2 which depicts the dividable die 10 in a partially assembled form. Each disc 23 and 24 is respectively provided with four support rings 30 and 31. The support rings 30 and 31 are mounted within the die pieces 17 and 19 so that they are coaxial with the die axis 13 and are axially spaced apart. Axial spacing is provided by a number spacer bars 32 which pass through appropriate apertures in the support rings 30 and 31 and are generally parallel with the longitudinal axis 13 of the die core 11 as can also be seen in FIG. 1.

Each of the die pieces 17 and 19 includes an annular array of spacer members, one array 33 of which can be seen in FIG. 2. The individual spacer members 34 are circumferentially spaced apart and their confronting faces 35 are so configured as to define the form of aerofoil blade flanks so that in cooperation with each other, the spacer members 34 define the form of the aerofoil blades 26.

Figure 3:
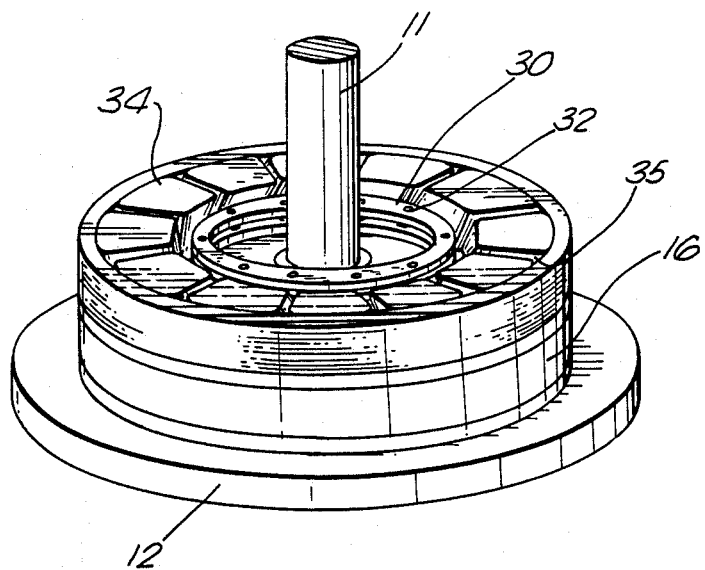
FIG. 3 is a view of the dividable die part shown in FIG. 2 when additionally provided with a filament wound support ring.

The shroud support rings 28 and 29 are both formed by the same method. In that method, which is described with respect to the formation of the shroud support ring 28, dry continuous carbon fibre is wound under tension around the radially outer extents of the inserts 34 to define a ring of fibre 35 as can be seen in FIG. 3. The ring of fibre 35 is subsequently impregnated with a resin matrix material as will be described later in order to define the shroud support ring 28.

When the support rings 30 and 31 have been placed in the die pieces 17 and 19 and rings of dry fibre 35 have been wound around the inserts 34 in both of the die pieces 17 and 19, the die 10 is assembled in the manner shown in FIG. 1. During the assembly of the die 10, hollow cylindrical plain bearing inserts 36 are placed around the core member 11 in radially spaced apart relationship therewith. These serve as bearing surfaces on the shaft 22 of the completed compressor rotor assembly 21. A further hollow cylindrical insert 37 having a longitudinal splined inner surface is placed around the core member 11. This insert 37 provides a splined portion on the shaft 22 of the compressor rotor assembly 21 to facilitate is coupling to suitable means for driving the compressor rotor assembly 21.

When the dividable die 10 has been completely assembled as described above, a mixture of short chopped fibres in a polyetheretherketone resin matrix is injected into that portion of the die 10 which defines the shaft 22 in an axial direction as indicated by the arrow 44. A cap 38 which directs the mixture flow around the core member 11 is located on the end of the core member 11. The injected mixture proceeds to flow through that portion of the interior of the die 10 which defines the shaft 22 to firstly enter a hollow portion 39 of the die pieces 20 which serves to define the configuration of the mounting flange 25. The mixture then flows along the annular spaced between the core member 11 and the radially inner surfaces of the die pieces 16, 17, 18, 19, 20a and 20b so as to form the shaft 22 and thence into the die pieces 17 and 19 to form the discs 23 and 24 and the aerofoil blades 26 and 27.

Annular arrays of apertures 40 and 41 are provided in those parts of the die retaining member 15 which are adjacent the rings of dry fibre 35 wound around the inserts 34. These arrays of apertures 40 and 41 serve two functions. Firstly they permit the escape of air from within the die 10 during the injection of the chopped carbon fibre/resin mixture. Secondly they permit the injection of an epoxy resin matrix material into those portions of the wound fibre 35 which have not been impregnated by the injected chopped carbon fibre/resin matrix mixture. Some degree of impregnation of the wound fibre 35 by the chopped carbon fibre/resin mixture does take place and this promotes a strong bond the aerofoil blades 26 and 27 and their respective shroud support rings 28 and 29.

It will be seen from FIG. 1 that by injecting the chopped carbon fibre/resin mixture along the axis of the core member, the majority of the fibres 42 in the mixture align themselves with the direction of mixture flow, that is, they are generally axially aligned. Similarly, the fibre/resin mixture which enters the die pieces 17, 19 and 20a and 20b flows in a generally radial direction so that the majority of the fibres 42 in the mixture within those die pieces are generally radially aligned. Thus in the moulded compressor rotor assembly 10, the majority of the fibres 42 within the shaft 22 are generally axially aligned whilst the majority of the fibres within the mounting flange 25, the discs 23 and 24 and the aerofoil blades 26 and 27 are generally radially aligned.

After the die 10 has been injected with both the chopped carbon fibre/polyetheretherketone resin mixture and the epoxy resin alone, it is placed in an oven and heated at an appropriate temperature in order to cure the epoxy resin. Thereupon the die is removed from the oven, and dissembled to reveal the resultant compressor rotor assembly 21.

Although the present invention has been described with reference to the manufacture of a compressor rotor assembly 21 which is formed from carbon fibre enclosed in a matrix material of a polyetheretherketone and an epoxy resin, it will be appreciated that alternative materials could be used if so desired. Thus the injected mixture could contain chopped fibres of silicon carbide or alumina and the matrix material could be an epoxy resin, a polyamide resin, aluminium or an alloy thereof, or magnesium or an alloy thereof, or titanium or an alloy thereof. Similarly the wound fibre 35 could be silicon carbide, steel or alumina and the matrix material injected into it could be a polyetheretherketone resin, a polyamide resin, aluminium or an alloy thereof or magnesium or an alloy thereof, or titanium or an alloy thereof. Moreover it will be appreciated that the matrix material/fibre combination of the shroud support rings 28 and 29 need not necessarily be the same as that of the remainder of the compressor rotor assembly 21.

It will be desirable in certain instances to replace the dry wound fibre 35 with a ready formed shroud support ring 28 or 29 which comprises a wound fibre in a matrix material. This would, of course, remove the need for the second step of injection of a matrix material through the apertures 40.

The support rings 30 and 31 which are enclosed within the discs 23 and 24 respectively may be formed from carbon fibre in an epoxy resin material as in the present example. They may however be formed from alternative materials such as those which may be used in the construction of the shroud support rings 28 and 29.

Although the present invention has been described with reference to a compressor rotor assembly 21 which comprises two bladed discs 23 and 24 and a mounting flange 25, it will be appreciated that the shaft 22 could be provided with one or three or more integral bladed discs if so desired.

It may be desired to produce a compressor rotor assembly 21 which has certain re-entrant features, particularly in the region of its aerofoil blades 26 and 27. If so the relevant portions of the die 10, for instance the inserts 34, may be made from a low melting point alloy which is melted out after the compressor rotor assembly 21 has been injection moulded. If all or part of the compressor rotor assembly 21 is formed using a metal matrix material then the relevant die portions could alternativly be made from a water dispersible ceramic material.

Throughout this specification, the term shaft is to be construed in a broad sense so as to embrace shafts which are of large diameter in relation to the diameters of the discs integral therewith. The present invention thus embraces drum assemblies having discs and aerofoil blade arrays integral therewith.

I claim:

1. A method of manufacturing a compressor rotor assembly comprising a shaft and at least one disc having integral radially extend aerofoil blades which disc is coaxially mounted on said shaft and is coaxial therewith, comprising injecting a mixture of short fibres and a matrix material into a dividable die so configured as to define the form of said compressor rotor assembly, said mixture being injected into said die at such a location that the majority of said fibres in said mixture which enter that portion of said die defining said shaft are generally axially aligned and the majority of said fibres in said mixture which enter the portions of said die which define said aerofoil blades are generally radially aligned, said portion of said die defining said at least one bladed disc containing at least one support ring which is so positioned within said die as to be integral with said bladed disc after said injection moulding step and additionally provide radial support for the thus moulded aerofoil blades and subsequently opening said die to release the thus moulded compressor rotor assembly.

2. A method of manufacturing a compressor rotor assembly as claimed in claim 1 wherein said at least one coaxially disposed support ring is so configured and located within said dividable die as to constitute a shroud ring member in the thus moulded compressor rotor assembly which is integral with and interconnects the radially outer tips of said radially extending aerofoil blades.

3. A method of manufacturing a compressor rotor assembly as claimed in claim 1 wherein said at least one coaxially disposed support ring comprises filament wound fibre.

4. A method of manufacturing a compressor rotor assembly as claimed in claim 3 wherein said fibre is filament would on to the radially outer extents of those portions of said die which serve to define the flanks of said aerofoil blades and is impregnated with a matrix material subsequent to said injection moulding of said short fibre/matrix material mixture.

5. A method of manufacturing a compressor rotor assembly as claimed in claim 4 wherein said fibre is so wound under tension.

6. A method of manufacturing a compressor rotor assembly as claimed in claim 1 wherein said at least one support ring is so positioned within said die as to be coaxially enclosed within said disc after said injection moulding operation so as to be adjacent the radially inner regions of said thus moulded radially extending aerofoil blades and thereby provide radial support therefor.

7. A method of manufacturing a compressor rotor assembly as claimed in claim 2 wherein at least one additional support ring is positioned within said die so as to be coaxially enclosed within said disc after said injection moulding operation so as to be adjacent the radially inner regions of said thus moulded radially extending aerofoil blades and thereby provide radial support therefor.

8. A method of manufacturing a compressor rotor assembly as claimed in claim 1 wherein said die is provided with at least one bearing insert which is so positioned within said die and configured as to be integral with said shaft of said compressor rotor assembly after said injection moulding step.

9. A method of manufacturing a compressor rotor assembly as claimed in claim 1 wherein said die is provided with an insert which is so positioned within said die and configured as to be integral with said shaft of said compressor rotor assembly after said injection moulding step to enable said shaft to be coupled to means adapted to drive said compressor rotor assembly.

10. A method of manufacturing a compressor rotor assembly as claimed in claim 1 wherein said short reinforcing fibres are selected from the group comprising carbon, silicon carbide and alumina.

11. A method of manufacturing a compressor rotor assembly as claimed in claim 1 wherein said matrix material with which said short reinforcing fibres is mixed is selected from the group comprising an epoxy resin, a polyetheretherketone resin, a polyimide resin, aluminium or an alloy thereof, magnesium or an alloy thereof, and titanium or an alloy thereof.

12. A method of manufacturing a compressor rotor assembly as claimed in any one of claims 1 to 11 wherein said at least one support ring comprises filament wound fibre, selected from the group comprising carbon fibre, steel wire, silicon carbide fibre and alumina fibre.

13. A method of manufacturing a compressor rotor assembly as claimed in claim 12 wherein said filament would fibre is enclosed in a matrix selected from the group comprising an epoxy resin, a polyetheretherketone resin, a polyimide resin, aluminium or an alloy thereof, magnesium or an alloy thereof and titanium or an alloy thereof.

14. A method of manufacturing a compressor rotor assembly as claimed in claim 1 wherein said die contains at least some pieces which are formed from a low melting point alloy, said alloy being melted out of said die prior to the removal of said injected compressor rotor assembly thereform.

15. A method of manufacturing a compressor rotor assembly as claimed in claim 1 wherein said die contains at least some pieces which are formed from a water dispersible ceramic based material, said material being removed from said die by treatment thereof with water prior to the removal of said injected compressor rotor therefrom.

* * * * *